(12) United States Patent
Morales

(10) Patent No.: US 7,893,823 B2
(45) Date of Patent: Feb. 22, 2011

(54) SEQUENTIAL BRAKE LIGHT SYSTEM

(76) Inventor: Charles J. Morales, 1787 Madison Ave., Bellmore, NY (US) 11710

( * ) Notice: Subject to any disclaimer, the term of this patent is extended or adjusted under 35 U.S.C. 154(b) by 230 days.

(21) Appl. No.: 12/138,643

(22) Filed: Jun. 13, 2008

(65) Prior Publication Data

US 2008/0309478 A1 Dec. 18, 2008

Related U.S. Application Data

(60) Provisional application No. 60/934,620, filed on Jun. 15, 2007.

(51) Int. Cl.
*B60Q 1/44* (2006.01)
(52) U.S. Cl. ...................... 340/479; 340/534; 340/932.2
(58) Field of Classification Search ................. 340/479, 340/467, 464, 478, 903, 466, 472, 468, 438, 340/441, 453, 534, 932.2
See application file for complete search history.

(56) References Cited

U.S. PATENT DOCUMENTS

| 4,918,424 | A | | 4/1990 | Sykora |
| 5,089,805 | A | * | 2/1992 | Salsman ...................... 340/467 |
| 5,150,098 | A | | 9/1992 | Rakow |
| 5,610,578 | A | | 3/1997 | Gilmore |
| 6,133,852 | A | * | 10/2000 | Tonkin ....................... 340/903 |
| 6,249,219 | B1 | | 6/2001 | Perez et al. |
| 6,351,211 | B1 | * | 2/2002 | Bussard ...................... 340/468 |
| 6,411,204 | B1 | | 6/2002 | Bloomfield et al. |
| 6,850,156 | B2 | | 2/2005 | Bloomfield et al. |
| RE39,730 | E | | 7/2007 | Brown |
| 7,495,550 | B2 | * | 2/2009 | Huang et al. ................ 340/435 |
| 2006/0273891 | A1 | * | 12/2006 | Quach et al. ................ 340/467 |

* cited by examiner

*Primary Examiner*—Daniel Previl
(74) *Attorney, Agent, or Firm*—Notaro, Michalos & Zaccaria P.C.

(57) ABSTRACT

A sequential brake light system for road vehicles has a brake light array of plural lights in a linear, concentric or radial series. A master and slave controllers are connected to the array for lighting the lights in sequence and repeatedly at a rate that is proportional to a deceleration of the vehicle upon braking. A speed sensor senses the instantaneous vehicle speed and deactivates the master controller if the speed is below a threshold value so that the array is not powered in stop-and-go traffic. A brake position sensor senses a position of the vehicle brake pedal and an accelerometer measures deceleration of the vehicle, so that the master controller receives signals corresponding to the instantaneous speed of the vehicle, a signal corresponding to the position of the brake pedal and a signal corresponding to the deceleration of the road vehicle for properly warning a trailing drive of the braking condition of the road vehicle.

20 Claims, 2 Drawing Sheets

SEQUENTIAL BRAKE LIGHT SYSTEM

CROSS REFERENCE TO RELATED APPLICATION

This application claims priority benefits under 35 U.S.C. §119(e), on U.S. provisional patent application 60/934,620 file Jun. 15, 2007, which provisional application is incorporated here by reference.

FIELD AND BACKGROUND OF THE INVENTION

The present invention relates generally to the field of automotive and other road vehicle signals, and in particular to a new and useful apparatus and method of signaling that a road vehicle is about to slow down or stop, to trailing vehicles on the road.

Everyday, millions of Americans climb into their road vehicles including cars, SUVs, trucks, minivans and the like, and make their way across the highways and byways of this great land. Whether a retired couple embarking on a cross country journey, a college coed enduring a long commute to school, or a busy homemaker driving a few blocks to the neighborhood grocer, automobiles offer consumers a simple way in which to get from one place to another, both safely and easily.

Perhaps the greatest invention of modern history, the introduction of the automobile, is often attributed to Henry Ford in the year 1896, however, the concept and prototype for both an internal combustion and steam engine vehicle, was developed years earlier. Regardless of when the first automobile made its way onto American roads, it is safe to say that this revolutionary product vastly changed the landscape of our country and as quickly as those early production models came off the assembly line, they were snapped up by a populace eager to experience the freedom of mobility that this new form of transportation afforded. Initially there was little concern for safety devices to be incorporated into the design of automobiles.

However, as the number of roads, cars and drivers multiplied, so did the number of automobile accidents, until the point that the Federal Government determined a need existed to require automobile manufacturers to begin designing safer cars. While safety belts, windshield wipers and turn signals were crucial in improving vehicle safety, one of the most important safety features mandated by the government was and still is, vehicle brake lights. Designed to alert motorists behind a vehicle if the driver is slowing or stopping, properly functioning brake lights are a crucial factor in preventing rear end collisions.

While there is little dispute that brake lights are a crucial safety element of any vehicle, there are drawbacks associated with their use. Specifically, standard automobile brake lights operate in a binary fashion, either 'on' or 'off,' indicating only that the drivers' foot is either on or off the brake pedal. The drivers of vehicles behind any given car have no way of differentiating if the car ahead is slowing down, coming to a stop or 'riding the brakes,' without correlation of the visual brake light signal with existing circumstances. The time required to correlate and assess this information may not always be enough to avoid an accident, particularly in emergency or panic braking situations which can, and do, unexpectedly arise. When driving along a road or busy highway, a car which is braking ahead of another car may be interpreted to be stopping when, in fact, that car may only be slowing down. Conversely, if the driver ahead unexpectedly stops, the driver of the vehicle behind that person may have assumed the vehicle ahead was simply slowing down. As a result of this misinterpretation of intent, a collision between the vehicles may occur.

Because standard brake lights do not distinguish between sudden, intense braking, or slow, casual, braking, many accidents take place which may have been avoidable if brake lights conveyed more detailed information about driver intent. Driving is too serious to be basing one's decisions on interpretation of ambiguous signals. Motorists need something more solid, more definite, to be fully cognizant of the braking intent of the driver in the vehicle ahead of them—whether the driver is braking for a gradual stop, a sudden stop, or merely slowing down.

Some solutions to this problem have been proposed. See for example: U.S. Pat. No. 4,918,424 to Sykora; U.S. Pat. No. 5,089,805 to Salsman; U.S. Pat. No. 5,150,098 to Rakow; U.S. Pat. No. 5,610,578 to Gilmore; U.S. Pat. No. 6,249,219 to Perez et al.; U.S. Pat. No. 6,351,211 to Bussard; U.S. Pat. Nos. 6,411,204 and 6,850,156 to Bloomfield et al.; and U.S. Reissued Patent RE39,730 to Brown.

Despite these various approaches to the problem, a need remains for an effective apparatus and method for warning a trailing driver of the braking intentions of a driver in a road vehicle ahead.

SUMMARY OF THE INVENTION

Having recognized the need for a brake light system which would visually alert other drivers of the amount of braking force being applied, that is, how fast a vehicle was being stopped, the inventor of this application has conceived the present invention which he has designated a sequential brake light system.

Improvements of the invention over the prior art included using a predetermined speed (e.g. 25 or 20 mph or other selected and specific threshold speed) at which the lights are activated. The invention does not use many different devices or flashing lights, bells or whistles to complicate and denigrate the invention, just simple red lights that are illuminated with purpose, according to the apparatus and method of the invention. The system of the invention is adaptable to all cars and other road vehicles without changing the appearance given to the vehicle by its manufacturer.

The sequential brake light system of the invention is a brake light system for automotive or other road vehicles which comprises a speed sensing device, a third brake light array mounted on the rear window or either tail light, and an interconnecting wiring or wireless connection. The third brake light is comprised of a series of individual light bulbs or LEDs, horizontally or vertically positioned in rows down or across the surface of the light assembly. Alternately, the array of the invention is a circular array, with the lights radiating about the perimeter of the array or in a concentric array in a similar manner as a target.

A speed sensor is connected to a logic circuit which, in turn, is connected to a vehicle computer system. The system of the invention is programmed to be activated at predetermined speeds, with the flashing motion of the lights deactivated once the vehicle has slowed to near stop. For example, the brake lighting system of the invention may be programmed to flash whenever a driver was traveling at speeds greater than 20 or 25 or other specific and selected number of miles per hour, thus affording drivers in other vehicles ample time to slow their own car, should the sequential brake light system begin to flash.

An override is also included which enables consumers to utilize this system only when traveling at higher speeds, (such as above 20 miles per hour) as opposed to when in stop-and-go traffic. Whenever a vehicle was traveling at a fairly high speed and the driver applied pressure to the brakes, the speed sensor sends a signal to the computer which activates the system, illuminating lower or central (or in the case of a circular unit, central or one radial) brake lights in the assembly. The speed of the vehicle and the amount of pressure applied to the brakes determines the number of lights illuminated to advise motorists to the rear how fast a vehicle is being braked, i.e. its rate of deceleration.

The sequential brake light system of the invention can be incorporated into the design of newly manufactured vehicles, or can be a product that is available as a kit to be installed within existing vehicle rear windows and wired to the existing brake light assemblies. In the case of the latter, the sequential brake light system of the invention is configured as a horizontal strip, with the lights in the array illuminating in sequence inward from opposite side of the array, toward the center of the array, each time the brake is depressed with more lights being lit to indicate a rapid deceleration, and fewer to indicate a slower deceleration.

As noted, many accidents are caused by drivers not being aware of another driver's intent when braking and the sequential brake light system of the invention can greatly reduce the number of these types of accidents. The safety benefits afforded by the invention could be beneficially used on cars, trucks, utility vehicles, and other road vehicles.

Accordingly an object of the present invention to is to provide a sequential brake light system for a road vehicle having a brake pedal with a pedal position that is proportional to a deceleration of the vehicle caused by braking, the system comprising: a brake light array comprising a plurality of individual lights in a series; a slave controller connected to the array for lighting the lights in the array in sequence and repeatedly at a rate that is proportional to a deceleration of the vehicle upon braking; the array and, optionally, the slave controller as well, being mounted in a rear electronics package for mounting at a rear of the road vehicle with the array being mounted so as to be visible to a driver of a trailing vehicle to the road vehicle; a speed sensor for sensing an instantaneous speed of the vehicle; a brake position sensor for sensing a position of the brake pedal; an accelerometer for measuring deceleration of the road vehicle; a master controller connected to the speed sensor for receiving a signal corresponding to the instantaneous speed of the vehicle, the master controller being connected to the brake position sensor for receiving a signal corresponding to the position of the brake pedal and to the accelerometer for receiving a signal corresponding to the deceleration of the road vehicle; and a wiring harness or wireless link (in an embodiment where the master and slave controllers are separate units), or a simple wire or logical connection when both units are in the same circuit or on the same chip, for connecting the master and the slave controllers to each other so that the master controller, when active, controls operation of the slave controller for lighting the lights in the array in sequence and repeatedly at a rate that is proportional to the deceleration as measured by the accelerometer and by the brake position sensor, the master controller being inactive below a selected threshold speed as sensed by the speed sensor, so that no sequential, repeating lighting of the lights in the array occur when the master controller is inactive.

A further object of the invention is to provide such a sequential brake light system, wherein the array of lights is a linear array of the plurality of lights, or is an array of a plurality of concentric lights, or an array of a plurality of radial lights circumferentially spaced around a circle.

A still further object of the invention is to provide a sequential brake light system, wherein the master controller is programed to be inactive below the threshold speed and/or including a manual controller connected to the master controller for manually setting the threshold speed.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
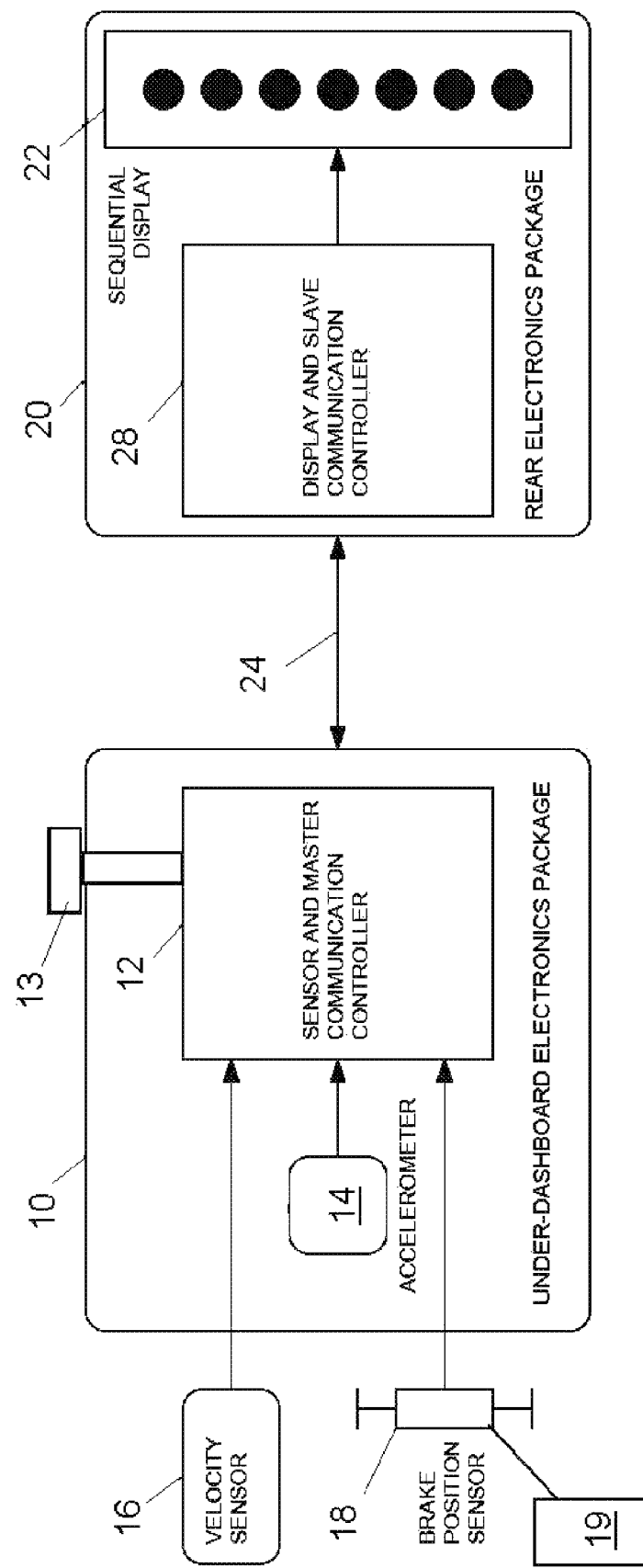
FIG. 1 is a schematic representation of the sequential brake light system of the invention.

Referring now to the drawings, FIG. 1 illustrates a sequential brake light system of the invention for automotive or other road vehicles. The system comprises a speed or velocity sensing mechanism or device 16, that is wires to, or is independent of the speedometer that is provided on all road-legal, road vehicles. For vehicles having a compatible speedometer, the existing speedometer of the vehicle can be wired to the system and the speed sensor 16.

Figure 2:
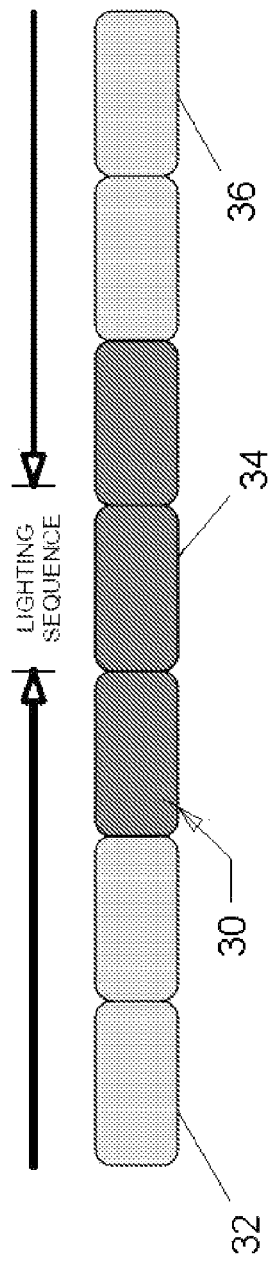
FIG. 2 is an elevational view of one embodiment of the invention that includes a linear warning light array.
Figure 3:
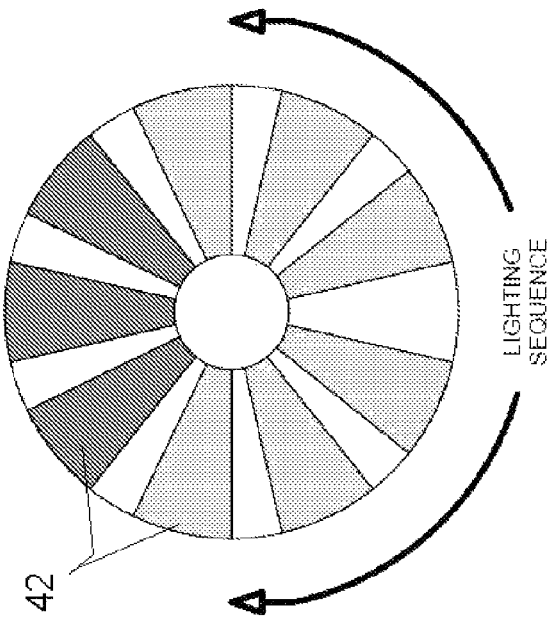
FIG. 3 is an elevational view of a second embodiment of the invention that includes a concentric warning light array.
Figure 4:
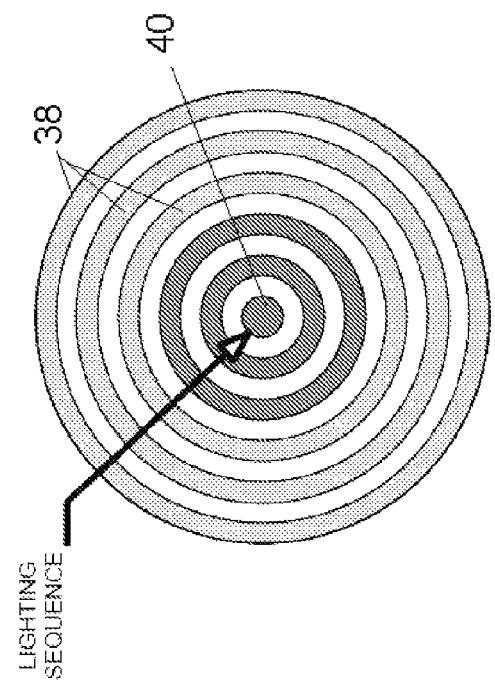
FIG. 4 is an elevational view of a third embodiment of the invention that includes a circular pattern of radial warning lights in the array.

The system of the intention includes a third brake light array 22, made up of a plurality of individual red lights in a series such as a linear series of lights 30, 32 and 34 in FIG. 2, or concentric lights 38 and 40 in FIG. 3, or radial lights 42 that are circumferentially distributed around a circle in FIG. 4. The array 22 is mounted on or behind the rear window or near either or both tail lights of the road vehicle, or at any location on the vehicle, so that the array 22 is visible to the driver of a trailing vehicle on the road. Although referred to here as a third brake light to indicate that the array is in addition to the two standard brake lights on all road-legal vehicles, it is understood that two arrays of the invention may be included, and that the one or two arrays may be mounted in any rearwardly facing orientation so as to be visible to a driver of a trailing vehicle.

Array 22 is connect to and is driven by a slave communication controller 28 that is connected by an interconnecting wiring harness or other (wireless or logical) connection 24, to a master communication controller 12. The third brake light or array 22 comprises a series of individual light bulbs or LEDs, that are horizontally or vertically positioned in one or more rows, down or across the surface of the light assembly or array as shown in FIG. 2. Alternately, the array of the invention is a circular shaped unit of FIG. 3 or 4, with the lights radiating about the perimeter of the array as in FIG. 4, or in concentric circles as in FIG. 3, or in other manners that simulate a target.

The speed sensor 16 is connected to a logic circuit in the master communication controller 12, which, in turn, is connected to a vehicle computer system in the controller 12. The system of the invention is programmed to be activated only at a predetermined and selected threshold speed, with the flashing sequential motion of the light array deactivated once the vehicle has slowed to near stop. For example, the brake lighting system of the invention may be programmed to function and flash upon braking, whenever a driver is traveling at speeds greater than 20 or 25 miles per hour, or another specific and selected threshold speed, thus affording drivers in other vehicles ample time to slow their own car, should the sequential brake light system begin to flash.

A manual override controller 13, such as a manual dial or a digital input pad, is also included, which enables consumer to utilize the system only when traveling at higher selected threshold speeds, such as above 20 miles per hour, as opposed to when in slow, stop-and-go traffic when the system of the invention may be unnecessary and perhaps even annoying to trailing drivers who are already moving slowly enough to be safe from dangerous accidents of the type to be avoided by the present invention. The manual override controller 13, may, for example be a rotatable knob as noted, with a scale, and control a selector circuit in controller 12, to allow the driver to selected the threshold speed below which the controlled 12 will not operate to light the array 22.

Whenever a vehicle is traveling at a fairly high speed, that is higher than the selected threshold speed, and the driver applies pressure to the brakes, the speed sensor 16 sends a signal to the computer which activates the system, illuminating lower or end light 32 in FIG. 2, or in the case of a circular unit of FIG. 3, the central light 40, or one of the radial lights 42 in the array of FIG. 4. The speed of the vehicle and the amount of pressure applied to the brakes determines the number of lights illuminated to advise motorists to the rear, how fast the vehicle is being braked and is decelerating. Alternatively, the central light 34 in FIG. 1, can be first lit with gradual braking, while additional lights to the left and right of array 30 may be lit to show an increasing rate of deceleration. The outer concentric light 38 in FIG. 3 may likewise be the first lit instead of the center light 40.

The system of the invention also includes a brake position sensor 18 that is engaged either electrically or mechanically to the vehicle brake pedal or braking apparatus shown schematically at 19. Sensor 18 sends its signal that is proportional to the brake position, to the controller 12, and thus inputs a signal that is related to the severity of the braking action. An accelerometer 14 is also connected to the controlled 12 for supplying the controller with a signal that is related to the actual instantaneous deceleration of the vehicle to even more accurately evaluate the magnitude of the vehicle declaration, to more accurately convey this information to the trailing driver. Accelerometer 14 augments the brake position sensor 18 since, depending on the speed, the condition of the vehicle brakes and other factors like road condition, the brake position senor alone may not accurately represent the vehicle's actual rate of deceleration, and thus the corresponding danger of an accident involving a trailing driver.

In one embodiment of the invention, accelerometer 14 and controller 12 are in an under-dashboard electronics package or unit 10 that is mounted, for example, near the driver and under the dashboard and is connected by the wiring harness 24 to a rear electronics package or unit 20 that includes the slave controller 28 and the light array 22 near the rear of the vehicle.

Alternatively to a wiring harness, reference numeral 24 in FIG. 1, schematically represents a wireless, or a closely wired, or a logical connection between the master and slave controllers. The master and slave controllers may be housed within the same physical housing where the connection 24 represents a logical separation between sensor (master) and display (slave) logic circuits that serve as the respective master and slave controllers. When housed in separate units, this connection 24 may be wireless, e.g. RF or conventional narrowband radio frequency or of the known ZigBee® type, or UWB (Ultra-Wideband) type, or other spread-spectrum type (SS such as Bluetooth™ Technology or 802.11a/b/g), or by any connection that is currently known, or to be discovered.

In operation, assuming the vehicle is initially traveling at greater than the selected threshold velocity or speed that is preprogrammed in controller 12 and/or is manually set by manual controller 13, so that the controller 12 of the invention is active, if a light braking is initiated by the driver by lightly pressing the brake pedal at 19, a small brake position signal from sensor 18 and a small or zero deceleration signal from accelerometer 14 are sent to the controller 12, causing it to drive slave controller 28 to light none of the lights in the array 22, or only one or only a few lights in the array 22, slowly and repeatedly, to indicate to the trailing driver that a gradual deceleration can be expected and that there is no immediate danger of collision.

If, on the contrary, or even after the light braking, the leading driver pressed hard on the brake pedal at 19, causing a large brake position signal from sensor 18 and a high deceleration signal from accelerometer 14, than the controller 12 will issue a signal to slave controller 28 to sequentially illuminate all the lights rapidly and to repeat the sequential flashing in the array 22, thereby warning the trailing driver of the imminent stopping of the leading vehicle.

An intermediate braking action and deceleration will produce an intermediate lighting sequence for array 22 in any of its forms of FIG. 2, 3 or 4. The speed and number of the lights in each warning display action are each time proportional to the severity of the braking action.

Since instinctively everyone will understand that rapid sequential and repetitive flashing of the red lights of array 22 warn of danger and therefore a rapid deceleration of the vehicle ahead, the invention automatically sets the level of warning at the level of danger. Conversely a slow sequence and repetition informs the trailing driver of a low danger and slow deceleration condition.

While specific embodiments of the invention have been shown and described in detail to illustrate the application of the principles of the invention, it will be understood that the invention may be embodied otherwise without departing from such principles.

What is claimed is:

1. A sequential brake light system for a road vehicle having a brake pedal with a pedal position proportional to a deceleration of the road vehicle caused by braking, the system comprising:

a brake light array comprising a plurality of individual lights in a series;

a slave controller connected to the array for lighting the lights in the array in sequence in a number of the lights, said number of lights being proportional to a deceleration of the road vehicle upon braking;

the array being mounted to be visible to a driver of a trailing vehicle to the road vehicle;

a speed sensor for sensing an instantaneous speed of the road vehicle;

a brake position sensor for sensing a position of the brake pedal;

an accelerometer for measuring deceleration of the road vehicle;

a master controller connected to the speed sensor for receiving a signal corresponding to the instantaneous speed of the road vehicle, the master controller being connected to the brake position sensor for receiving a signal corresponding to the position of the brake pedal and to the accelerometer for receiving a signal corresponding to the deceleration of the road vehicle; and a connection between the master and the slave controller, the master controller, when active, controlling operation of the slave controller for lighting lights in the array in sequence in a number of the lights proportional to the deceleration as measured by the accelerometer and by the brake position sensor;

the master controller being programmed to be inactive below a selected threshold speed as sensed by the speed sensor, no sequential lighting of the lights in the array occurring when the master controller is inactive.

2. The sequential brake light system of claim 1, wherein the array of lights is a linear array of the plurality of lights.

3. The sequential brake light system of claim 1, wherein the array of lights is an array of a plurality of concentric lights.

4. The sequential brake light system of claim 1, wherein the array of lights is an array of a plurality of radial lights circumferentially spaced around a circle.

5. The sequential brake light system of claim 1, wherein the master controller is programmed to be inactive below a threshold speed of about 20 mph.

6. The sequential brake light system of claim 1, wherein the master controller is programmed to be inactive below a threshold speed which is about 20 to 25 mph.

7. The sequential brake light system of claim 1, including a manual controller connected to the master controller for manually setting the threshold speed.

8. The sequential brake light system of claim 1, including a manual controller connected to the master controller for manually setting the threshold speed to a speed which is about 20 to 25 mph.

9. The sequential brake light system of claim 1, wherein the master controller and the accelerometer are mounted in an under-dashboard electronics package mounted near a driver of the road vehicle.

10. The sequential brake light system of claim 1, wherein the master controller also is programmed to be inactive below the threshold speed which is about 20 to 25 mph.

11. A sequential brake light system for a road vehicle having a brake pedal with a pedal position proportional to a deceleration of the vehicle caused by braking, the system comprising:

a brake light array comprising a plurality of individual lights in a series;

a slave controller connected to the array for lighting the lights in the array in sequence and repeatedly at a rate, said rate being proportional to a deceleration of the vehicle upon braking;

the array and the slave controller being mounted in a rear electronics package for mounting at a rear of the road vehicle with the array being mounted to be visible to a driver of a trailing vehicle to the road vehicle;

a speed sensor for sensing an instantaneous speed of the vehicle;

a brake position sensor for sensing a position of the brake pedal;

an accelerometer for measuring deceleration of the road vehicle;

a master controller connected to the speed sensor for receiving a signal corresponding to the instantaneous speed of the vehicle, the master controller being connected to the brake position sensor for receiving a signal corresponding to the position of the brake pedal and to the accelerometer for receiving a signal corresponding to the deceleration of the road vehicle;

a connection between the master and the slave controller, the master controller, when active, controlling operation of the slave controller for lighting the lights in the array in sequence and repeatedly at a rate proportional to the deceleration as measured by the accelerometer and by the brake position sensor, the master controller being inactive below a selected threshold speed as sensed by the speed sensor, no sequential, repeating lighting of the lights in the array occurring when the master controller is inactive;

the master controller and the accelerometer being mounted in an under-dashboard electronics package mounted near a driver of the road vehicle; and a manual controller connected to the master controller for manually setting the threshold speed.

12. The sequential brake light system of claim 11, wherein the array of lights is a linear array of the plurality of lights.

13. The sequential brake light system of claim 11, wherein the array of lights is an array of a plurality of concentric lights.

14. The sequential brake light system of claim 11, wherein the array of lights is an array of a plurality of radial lights circumferentially spaced around a circle.

15. The sequential brake light system of claim 11, wherein the master controller is also programmed to be inactive below the threshold speed.

16. A method for warning a trailing driver of a severity of a braking of a road vehicle ahead of the trailing driver, comprising:

providing a sequential brake light system for the road vehicle, the road vehicle having a brake pedal with a pedal position proportional to a deceleration of the road vehicle caused by braking, the system including a brake light array comprising a plurality of individual lights in a series that are driven by a slave controller connected to the array for lighting the lights in the array in sequence in a number of the lights proportional to a deceleration of the road vehicle upon braking, the array being mounted to be visible to a driver of a trailing vehicle to the road vehicle;

measuring an instantaneous speed of the road vehicle;

determining a brake position of the brake pedal;

measuring a deceleration of the road vehicle;

providing a master controller for receiving the instantaneous speed of the road vehicle, the position of the brake pedal and the deceleration of the road vehicle, the master controller being connected to the slave controller;

operating the master controller, when active, to control operation of the slave controller for lighting lights in the array in sequence in a number of the lights proportional to the deceleration and the brake pedal position; and programming the master controller to be inactive below a selected threshold speed, no sequential lighting of the lights in the array occurring when the master controller is inactive.

17. The method of claim 16, including providing the array of lights as a linear array of the plurality of lights.

18. The method of claim 16, including providing the array of lights as an array of a plurality of concentric lights.

19. The method of claim 16, including providing the array of lights as an array of a plurality of radial lights circumferentially spaced around a circle.

20. The method of claim 16, including manually setting the threshold speed.

\* \* \* \* \*